Dec. 25, 1956 W. W. BURROUGHS, JR 2,775,070
SEALING APPARATUS FOR MERCURY ARC DISCHARGE TUBES
Filed Jan. 29, 1954 4 Sheets-Sheet 1

INVENTOR.
WILLIAM W. BURROUGHS JR.
BY Joseph C. Ryan
attorney

Dec. 25, 1956     W. W. BURROUGHS, JR     2,775,070
SEALING APPARATUS FOR MERCURY ARC DISCHARGE TUBES
Filed Jan. 29, 1954                                4 Sheets-Sheet 2

INVENTOR.
WILLIAM W. BURROUGHS JR.
BY Joseph C. Ryan
Attorney

Dec. 25, 1956   W. W. BURROUGHS, JR   2,775,070
SEALING APPARATUS FOR MERCURY ARC DISCHARGE TUBES
Filed Jan. 29, 1954   4 Sheets-Sheet 3

INVENTOR.
WILLIAM W. BURROUGHS JR.
BY Joseph C. Ryan
Attorney

INVENTOR.
WILLIAM W. BURROUGHS JR.

United States Patent Office 2,775,070
Patented Dec. 25, 1956

2,775,070

SEALING APPARATUS FOR MERCURY ARC DISCHARGE TUBES

William W. Burroughs, Jr., Manchester, Mass., assignor to Sylvania Electric Products Inc., Salem, Mass., a corporation of Massachusetts Application January 29, 1954, Serial No. 407,017

3 Claims. (Cl. 49—2)

This invention relates to the manufacture of high pressure mercury arc discharge tubes and more particularly to an apparatus for sealing the electrodes therein.

In the manufacture of high pressure mercury arc discharge tubes, a highly refractory glass tube, such as quartz, is usually provided with end members of highly refractory material, such as a glass having a high silica content, within which the electrodes are sealed. Since a hermetic seal must be effected between the electrodes and the end members through which they extend, and since the end members are highly refractory, considerable difficulty has been encountered heretofore in effecting this sealing operation, as a result of which this operation has usually been performed manually.

The primary object of this invention is to seal the electrodes in the end members of a high pressure mercury arc discharge tube automatically.

This and other objects, advantages and features of my invention will be apparent to those skilled in the art from a consideration of the description below of a specific embodiment thereof. In accordance with the principles of my invention an electrode to be sealed in an end member is positioned therein and a ring-type burner is moved into encompassing relationship with respect thereto. The ring-type burner is both reciprocated in a vertical plane and oscillated in a horizontal plane in heating relationship with respect to the work to obtain a hermetic seal between the electrode and the end member within which it is disposed.

In the specific embodiment of my invention shown in the accompanying drawings, Figure 1 is a plan view of a head assembly of the sealing apparatus.

Figure 1:
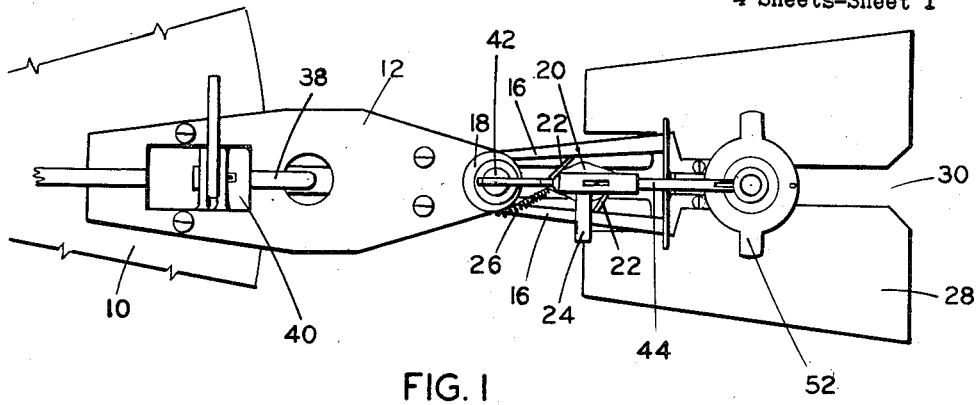
Figure 2:
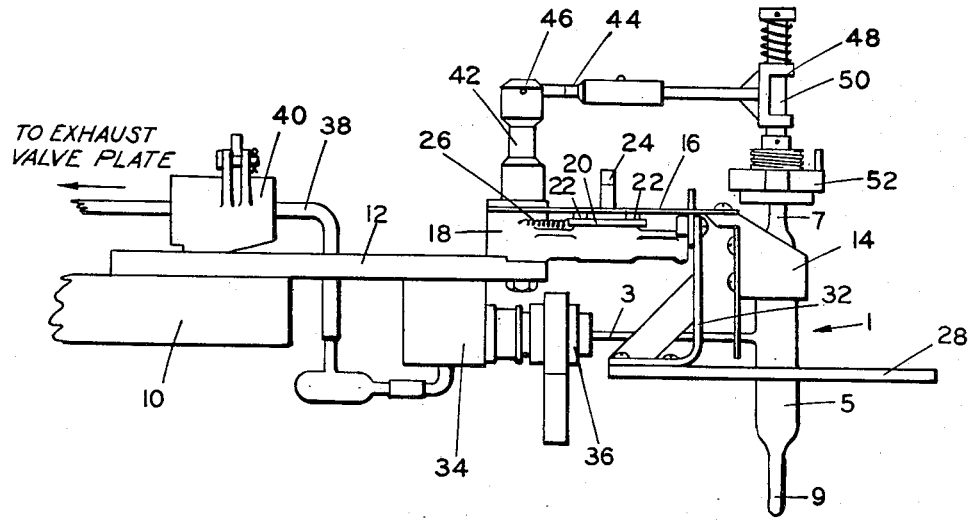
Figure 2 is a side elevational view of the head assembly of Figure 1.

Referring now to Figures 1 and 2, the rotatable turret type machine with which the apparatus of my invention may be employed comprises a rotatable table 10, about the periphery of which a plurality of radially extending head-supporting arms 12 are mounted. Each head comprises a pair of cooperating tube-gripping jaws 14 mounted on one end of a pair of levers 16, the levers 16 being pivotally mounted at their other ends on arm 18 which is mounted on arm 12. Lever 20, which is pivotally mounted at its center on the top face of arm 18, is provided with a pair of links 22 which connect it to levers 16 and a handle 24 upstanding thereon. Thus jaws 14 are opened to receive a tube 1 therebetween by clockwise rotation of handle 24, the motion being translated through lever 20, links 22, and levers 16 to the jaws 14. The lever 20, and consequently the jaws 14, is spring-loaded by spring 26, one end of which is attached to lever 20 and the other end thereof being attached to a suitable fixed member (not shown). A heat baffle 28, having a slot 30 therein for the extension therethrough of tube 1, is mounted on bracket 32 which is attached to arm 18.

Exhaust tubulation 3 of tube 1 is connected to exhaust head 34 mounted on arm 12 through tubulation pinching device 36 which effects a hermetic seal therebetween. Exhaust head 34 is connected to an exhaust valve plate (not shown) through tubing 38. The tubing 38 passes through a pinchcock 40 mounted on arm 12, the pinchcock serving as a device for closing off the head from the exhaust system when desired.

A post 42, mounted on arm 18 has a rod 44 pivotally mounted thereon at 46. Rod 44 has a bracket 48 mounted thereon, through which spring-loaded rod 50 extends. Cap 52 rotatably mounted on rod 50 has a chamber therein for the reception of an end of tube 1.

Figure 3:
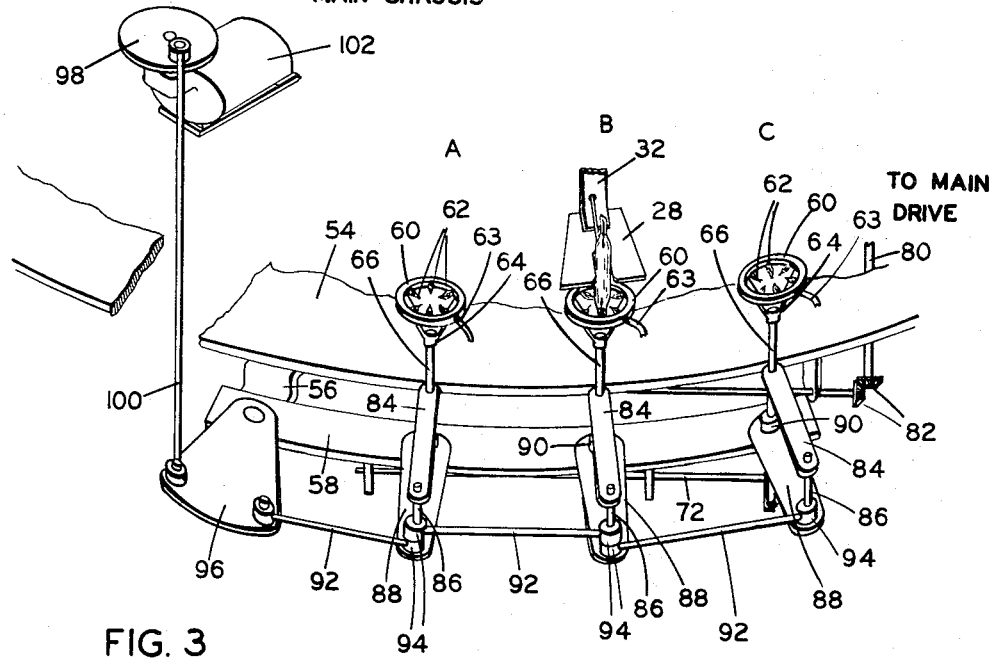
Figure 3 is a perspective view from above of the sealing apparatus.
Figure 4:
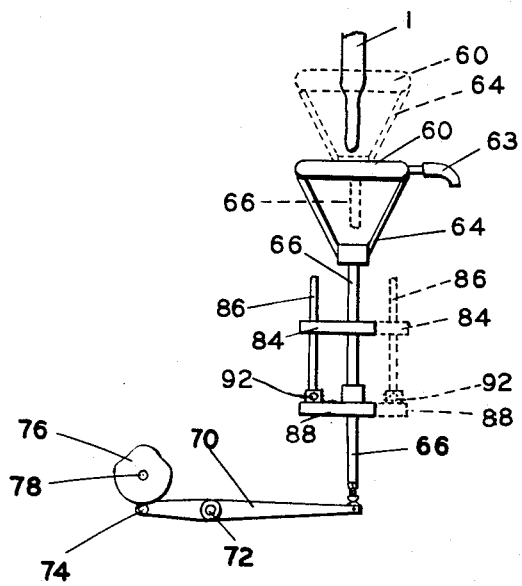
Figure 4 is an elevational view of the burner assembly and a portion of its actuating mechanisms, the disposition thereof in its advanced position of oscillation and reciprocation being shown in phantom.

The burners which heat the tube 1 and their actuating mechanisms are shown in Figure 3. The rotatable turret type machine with which the apparatus of this invention is illustrated is provided with a stationary table 54 (Fig. 3) which is disposed beneath the rotatable table 10 (Fig. 1). Brackets 56 depending from table 54 support shelf 58. Each burner comprises a ring manifold 60 and a plurality of burner tips 62 extending radially inward therefrom, connection to the ring manifold from a gas source being made through flexible tubing 63. Ring manifold 60 is seated on the legs of a tripodial support 64 mounted on one end of a rod 66. The other end of rod 66 rests on rocker arm 70 which is mounted on rocker arm shaft 72. The rocker arm 70 is provided with a cam follower 74 which rides on cam 76 on cam shaft 78. Cam shaft 78 is driven from the main drive of the machine through shaft 80 and bevel gears 82.

A lever 84 is mounted at one end thereof on rod 66. The other end of lever 84 has an aperture therein through which rod 86 extends. Rod 86 is mounted on one end of link 88 which is rotatably supported at its other end on shelf 58. The link 88 has an aperture therein and is provided with a bushing 90 through which rod 66 extends. The rods 86 on the links 88 are connected to one another by connecting rods 92 through ball and socket joints 94. One of the connecting rods 92 is connected to a lever 96 pivotally mounted on shelf 58. The lever 96 is connected to disk crank 98 by rod 100, the disk crank 98 being driven by motor 102 mounted on the main chassis (not shown) of the rotatable turret type machine with which the apparatus is employed.

Figure 5:
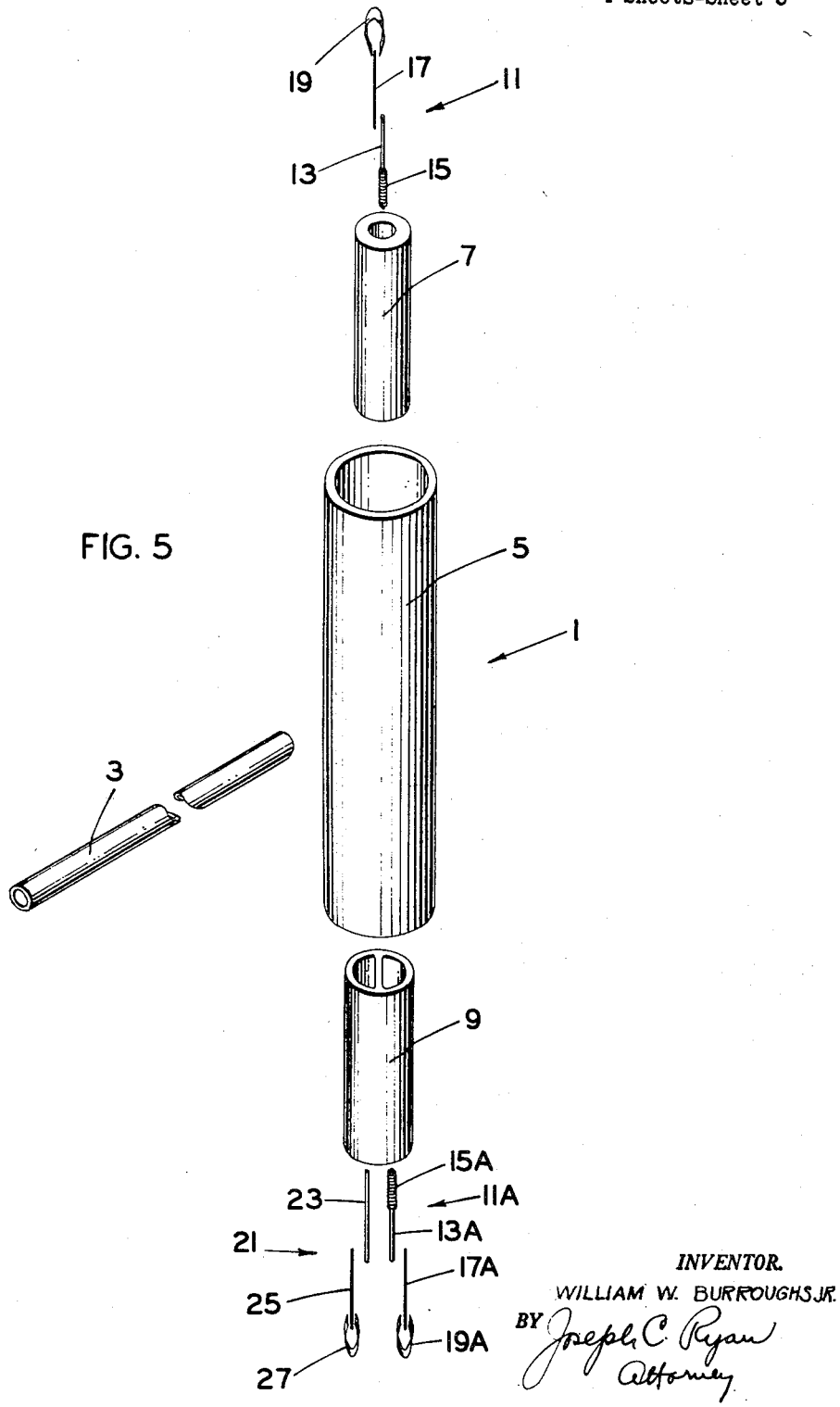
Figure 5 is an exploded view of a high pressure mercury arc discharge tube.

Referring now to Figure 5, the arc tube 1 comprises a quartz tube 5 having an exhaust tubulation 3 extending laterally therefrom, a single bore end member 7 at one end of tube 5, and a double bore end member 9 at one other end thereof. Electrode 11, which is located in the single bore end member 7, comprises a tungsten supporting rod 13, a coil of tungsten wire 15 wound about and attached to rod 13, an electron emitting material (not shown) such as a slug of thorium for example disposed between the coil of tungsten wire 15 and the rod 13, a ribbon of molybdenum 17 attached to rod 13, and a loop of molybdenum 19 attached to ribbon 17. An electrode which is located in one of the bores of the double bore end member 9 is similar to electrode 11 and is identified by reference character 11a. The several components of electrode 11a have been similarly identified. An auxiliary electrode 21 is located in the other bore of the double bore end member 9. The auxiliary electrode 21 comprising a tungsten rod 23, a ribbon of molybdenum 25 attached to the rod 23, and a loop of molybdenum 27 attached to the ribbon 25.

Before the electrodes 11, 11a and 21 (Fig. 5) are sealed in their end members 7 and 9, end members 7 and 9 and exhaust tubulation 3 are sealed to tube 5, and the tip 9a of end member 9 is heated just enough to close it. Electrode 11a and electrode 21 are then dropped into their respective bores in end member 9 through end member 7 and tube 5. This assembly is then placed on the apparatus of Figures 1, 2 and 3, the lever 24 being rotated clockwise to open the jaws 14 to permit the tube 5 to be positioned therebetween, and the exhaust tubulation 3 being threaded into tubulation pinching device 36 of exhaust head 34. Release of lever 24 permits the spring 26, which was loaded by the clockwise rotation of lever 24 to effect a secure gripping of tube 5 by the jaws 14. The pinching device 36 is then tightened about tubulation 3 to effect a hermetic seal therebetween. Rod 44, which is pivotally mounted on post 42 at 46, is then swung into position to bring the cap 52 into encompassing relationship with respect to the open end of end member 7. The cap 52 is then rotated to effect a hermetic seal between the end member 7 and a resilient collar (not shown) within the cap 52. Since it is desirable to prevent oxidation of the electrodes during the sealing operation, exhaust head 34 is connected to an exhaust pump through tubing 38, the pinchcock 40 being opened after a tube has been prepared for the sealing operation as just described.

Figure 6:
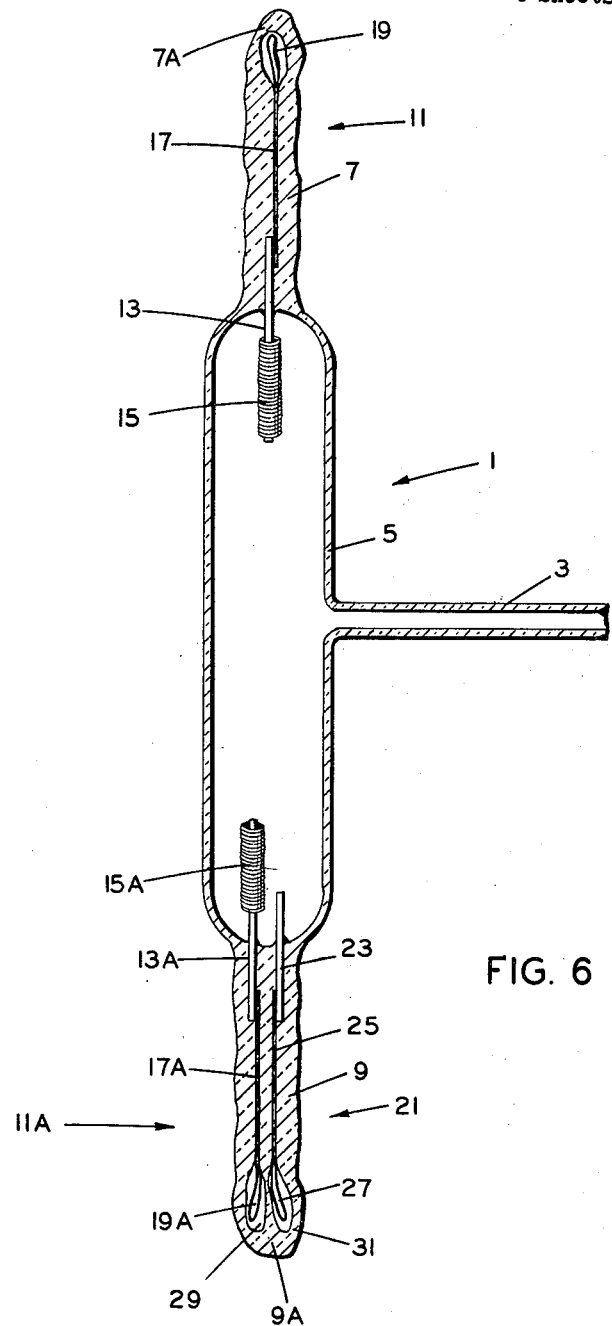
Figure 6 is a longitudinal sectional view of the tube with the electrodes sealed therein.

The machine is then indexed to bring the tube 1 into heat-receiving relationship with respect to the series of burners 60, 62 (Fig. 3) in order to effect a hermetic sealing of electrodes 11a and 21 to end member 9. As soon as head-supporting arm 12 moves into Station A (Fig. 3), the burner 60, 62 is reciprocated and oscillated to heat the end member 9 along a substantial part of its length and about its periphery. Reciprocation of the burner 60, 62 is effected by one of the cams 76 on cam shaft 78 through cam follower 75, rocker arm 70, and rod 66 on which the burner is mounted. Oscillation of the burner 60, 62 is effected by motor 102 through disk crank 98, rod 100, lever 96, connecting rod 92, rod 86, lever 84 and rod 66 on which the burner is mounted. At Stations B and C further heating of end member 9 is effected by the reciprocating and oscillating burners 60, 62 at these stations to obtain a hermetic seal between end member 9 and electrodes 11a and 21. As may be noted from an examination of Figure 6, the ribbon of molybdenum 17a and a portion of the supporting rod 13a of electrode 11a, and the ribbon of molybdenum 25 and a portion of the supporting rod 23 of electrode 21 are sealed to end member 9, but the loops 19a and 27 are disposed in pockets 29 and 31 respectively. This is accomplished by limiting the reciprocating stroke of the burners 60, 62 so that they do not directly heat that portion of the end member 9 within which the loops are disposed.

After the electrodes 11a and 21 have been sealed in end member 9, electrode 11 is sealed in end member 7. Electrode 11 is dropped into tube 5 through end member 7, the tip 7a of end member 7 is heated just enough to close it, and the tube assembly is inverted to permit the electrode 11 to drop down into the bore of end member 11. The tube assembly is then placed on the apparatus of Figures 1, 2 and 3 and the sealing of electrode 11 within the end member 7 is effected in the same manner in which electrodes 11a and 21 were sealed to their end member 9 as described above. After the electrode 11 has been sealed in end member 7, the tips 7a and 9a (Fig. 6) are severed from end members 7 and 9 respectively, thereby exposing loops 19, 19a and 27 to which electrical connections may be made. The arc tube 1 is now ready to be processed on an exhausting and filling machine.

What I claim is:

1. In a rotatable turret type machine having a plurality of work-supporting heads mounted thereon and movable to a plurality of work stations, the combination of: means for holding said work in said head; a ring-type burner disposed at at least one of the work stations; means for reciprocating said burner in encompassing relationship with respect to the work at said one work station and means for oscillating said burner in encompassing relationship with respect to the work at said one work station all to effect a heating thereof.

2. In a rotatable turret type machine having a plurality of work-supporting heads mounted thereon and movable to a plurality of work stations, apparatus for hermetically uniting a vitreous tube, carried by one of said work-supporting heads, and a metallic conductor disposed within the vitreous tube, said apparatus comprising: means for supporting said vitreous tube and metallic conductor in fixed position in said work-supporting head; a ring-type burner disposed at at least one of the work stations; means for reciprocating said burner in encompassing relationship with respect to the vitreous tube and the metallic conductor; and means for oscillating said burner in encompassing relationship with respect to the vitreous tube and the metallic conductor all to soften and collapse the vitreous tube to hermetically unite it to the metallic conductor.

3. In a rotatable turret type machine having a plurality of work-supporting heads mounted thereon and movable to a plurality of work stations, apparatus for hermetically uniting a vitreous tube, carried by one of said work-supporting heads, and a metallic conductor disposed within the vitreous tube, said apparatus comprising: means for supporting said vitreous tube and metallic conductor in fixed position in said work-supporting head; a ring-type buner disposed at at least one of the work stations; a rod on which said burner is fixedly mounted at one end thereof; means engaging said rod at the other end thereof for reciprocating it and the burner mounted thereon to thereby reciprocate said burner in encompassing relationship with respect to the vitreous tube and the metallic conductor; and means connected to said rod intermediate its ends for oscillating it and the burner mounted thereon to thereby oscillate said burner in encompassing relationship with respect to the vitreous tube and the metallic conductor to soften and collapse the vitreous tube to hermetically unite it to the metallic conductor.

References Cited in the file of this patent

UNITED STATES PATENTS

| | | |
|---|---|---|
| 2,102,357 | Dichter | Dec. 14, 1937 |
| 2,221,788 | Doyle | Nov. 19, 1940 |
| 2,237,186 | Malloy | Apr. 1, 1941 |
| 2,273,809 | Kinzel | Feb. 17, 1942 |
| 2,361,517 | White et al. | Oct. 31, 1944 |

FOREIGN PATENTS

| | | |
|---|---|---|
| 687,922 | Great Britain | Feb. 25, 1953 |